United States Patent [19]

Hosoya et al.

[11] Patent Number: 5,402,824
[45] Date of Patent: Apr. 4, 1995

[54] SOLENOID VALVE

[75] Inventors: Yukio Hosoya; Kei Fukuyo, both of Shizuoka, Japan

[73] Assignee: Nisshinbo Industries Inc., Tokyo, Japan

[21] Appl. No.: 48,184

[22] Filed: Apr. 20, 1993

[30] Foreign Application Priority Data

Apr. 24, 1992 [JP] Japan .................................. 4-129762
Apr. 28, 1992 [JP] Japan .................................. 4-134460

[51] Int. Cl.$^6$ .................................. F16K 31/06
[52] U.S. Cl. .......................... 137/596.17; 303/119.2; 137/484.2; 251/129.07
[58] Field of Search .......................... 251/282, 129.07; 137/546.17, 454.2; 303/119.2

[56] References Cited

U.S. PATENT DOCUMENTS 2,826,215  3/1958  Wolfslau et al. ............ 251/129.07 X
4,478,241 10/1984  Cardenas-Franco et al. .................. 137/596.17 X
5,167,442 12/1992  Alaze et al. .................. 303/119.2 X

FOREIGN PATENT DOCUMENTS 2121516 12/1983  United Kingdom ........... 137/596.17

Primary Examiner—John C. Fox
Attorney, Agent, or Firm—Nikaido, Marmelstein Murray & Oram

[57] ABSTRACT

A solenoid valve incorporates a pressure chamber with passage to an inlet port, a pressure chamber with passage to an outlet port, and an electromagnetically-actuatable valve arrangement fitted in the fluid line between the two pressure chambers. The chambers are manufactured inside a housing inserted into a housing cavity bored into a mounting block. The opening or closing of the valve arrangement switches fluid lines, wherein each pressure chamber is fitted on either side in the axial direction with a seal in which the pressure-subjected area of each seal is virtually equal. Each pressure chamber is connected with passage to a corresponding inlet or outlet port. Thus, no axial force in any one direction is generated no matter how high the pressure becomes within a pressure chamber.

Further, a pair of solenoid valves can be inserted face-to-face on either side of a housing cavity bored through the full length of the mounting block. The valve arrangement of each solenoid valve is set inside a common monolithic housing, thereby enabling another pressure chamber connected to either an inlet port or outlet port as appropriate, to be common to both solenoid valves.

2 Claims, 7 Drawing Sheets

ID VALVE

BACKGROUND OF THE INVENTION

1. Field of Invention

This invention relates to a solenoid valve which can be used for example, in a vehicle to control brake fluid pressure by opening or closing the various brake lines.

2. Description of Prior Art

Figure 11:
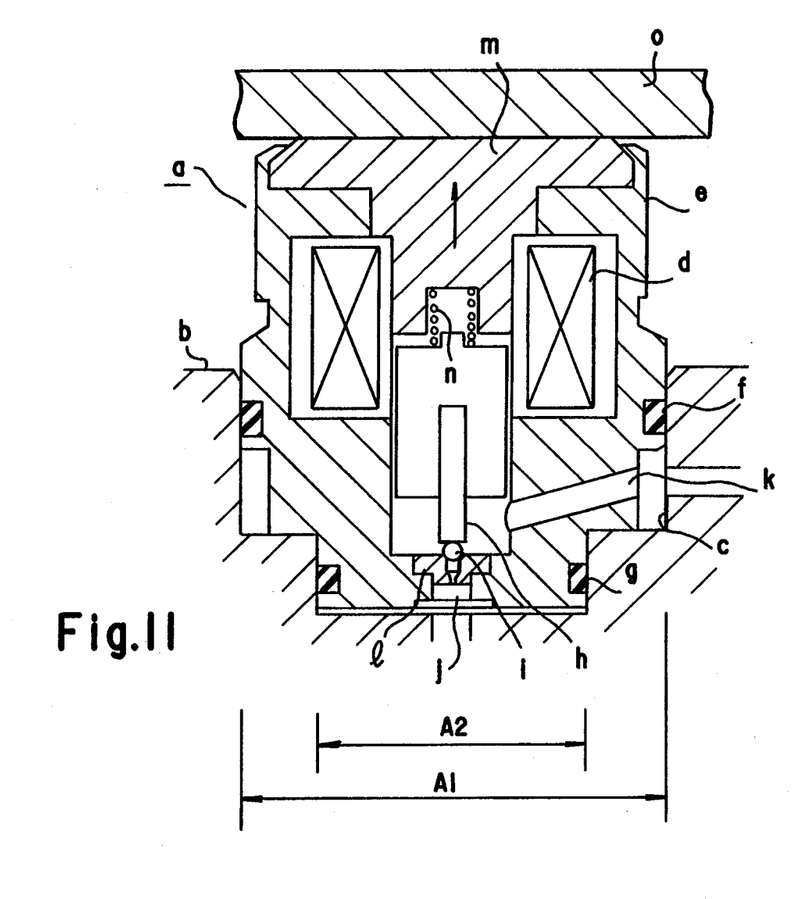
FIG. 11 is a cross sectional diagram of a solenoid valve in the prior art upon which this invention is based.

This type of solenoid valve has been used in an anti-locking braking system (ABS) or traction control system (TCS) of an automobile. For that purpose, the solenoid valve fitted in a valve block, which is comprised of several normally open solenoid valves and normally closed solenoid valves, a hydraulic pump, and a pressure chamber. FIG. 11 illustrates a normally closed solenoid valve a incorporated into a valve block.

In this configuration, a mounting block b is used to mount several solenoid valves a. On one side of said mounting block b several housing cavities c, each of non-uniform diameter over the length of the cavity are bored at prescribed intervals, wherein brake fluid lines drilled through the mounting block b pass between the housing cavities.

Solenoid valve a is configured from an energizing coil d, a case e which houses said energizing coil d, and a plunger h housed in the center of the case. Valve seat l is positioned in the center on the bottom of the case e. Plunger h is a selector valve comprised of a valve head i molded on its tip and the valve seat l.

When coil d is de-energized, valve head i remains seated in valve seat i by the spring force of the spring n compressed between plunger h and yoke ring m which blocks passage through port 1 j and port 2 k; when coil d is energized, an energizing force in the direction to compress spring n acts upon plunger h, wherein valve head i separates from valve seat i to open passage between the two ports j and k.

Seal t and seal g are fitted around the lower segment of the case e to ensure an airtight seal of the solenoid valve a in the lower recess of housing cavity c.

With a solenoid valve a of this type, should pressure be generated at port 2 k when the valve arrangement is closed, the said pessure acts in the direction to lift solenoid valve a out of housing cavity c. This separation force is generated by the following mechanism.

Setting the pressure-subjected area of seal t as A1, the pressure-subjected area of seal g as A2, and the pressure of port k as P, then the pressure acting upon seal f is the product of the area A1 multiplied by pressure $P(A1 \times P)$ and the pressure acting upon seal g is the product of the area A2 multiplied by pressure $P(A2 \times P)$.

Accordingly, a separation force equal to the difference between the two pressures $[(A1 \times P)-(A2 \times P)]$ is generated. This separation force becomes proportionally larger the greater the difference between the pressure-subjected areas of seal t and seal g at each position.

A steel plate or other high-strength pressure plate o is positioned on the outside of the yoke ring m to press against valve a to resist the force in the axial direction (axial force) caused by this pressure.

Problematic Points with Conventional Solenoid Valves

Conventional solenoid valves of a type as described have problematic points as follows.

1. Case e of the solenoid valve a must be very strong to resist the axial force caused by the generated pressure.
2. The higher the maximum pressure generated inside solenoid valve a, the thicker must be the pressure plate o, which makes the valve block larger and heavier.
3. Case e of the energizing coil d and the pressure plate o will more than likely deform to some extent because of the axial force, no matter how strong they are designed. Even the slightest deformation in the pressure plate o will result in hydraulic fluid consumption. This phenomenon becomes a problem when the solenoid valve a is used as a brake element since it will increase the stroke length of the brake pedal.
4. In order to reduce the axial force, the pressure-subjected areas of seal f and seal g could be made smaller, but there is a limit to this reduction in area depending on the relationship of these seals to the internal components of the solenoid valve, as well as strength consideration.
5. Since the solenoid valves are all installed on the same side face of the mounting block, the greater the number of solenoid valves being installed, and thus the greater and heavier must be the external dimensions of the mounting block, wherein it becomes difficult to set the valve block in a narrow space.
6. A housing cavity, pressure chamber, and fluid line must be manufactured for each solenoid valve, necessitating a large number of manufacturing steps for the mounting block.

SUMMARY OF INVENTION

The objective of this invention is to provide a solenoid valve in which the forces generated with a rise in the internal pressure of the pressure chamber and acting in opposite axial directions will be equalized thus cancelling each other, wherein this equilibration is achieved by setting the pressure-subjected areas of seals on either side of the pressure chamber to be virtually equal, and connecting a passage port on the side face of the pressure chamber.

A second objective is to simplify the stationary devices of the solenoid valve.

A third objective is to prevent a massive deformation of the solenoid valve, to avoid wasting the pressure medium.

A fourth objective is to enable the housing of the solenoid valve to be made of low strength material.

A fifth objective is to make the solenoid valve smaller and lighter and to reduce the number of manufacturing steps required to manufacture the valve.

A sixth objective is to provide a general-purpose solenoid valve which can be used as a pressure switching valve, a pressure regulator valve, a selector valve, a pressure control valve, and other types of pressure valves.

A seventh objective is to have a pressure chamber connected to either an inlet port or outlet port so as to be common to two solenoid valves each connected to a port of the other type in the same housing.

A eighth objective is to make the mounting block which comprises the valve block to be smaller and lighter.

A ninth objective is to simplify the fabrication of the housing cavities in the mounting block.

BRIEF DESCRIPTION OF THE DRAWINGS

The invention will be described by examples of various configurations and their operation thereof, with reference to the accompanying diagrams, in which.

DETAILED DESCRIPTION OF THE PREFERRED EMBODIMENTS

Example 1

Examples of this invention are explained following with reference to the diagrams.

A. Overall Configuration

Figures 1, 2:
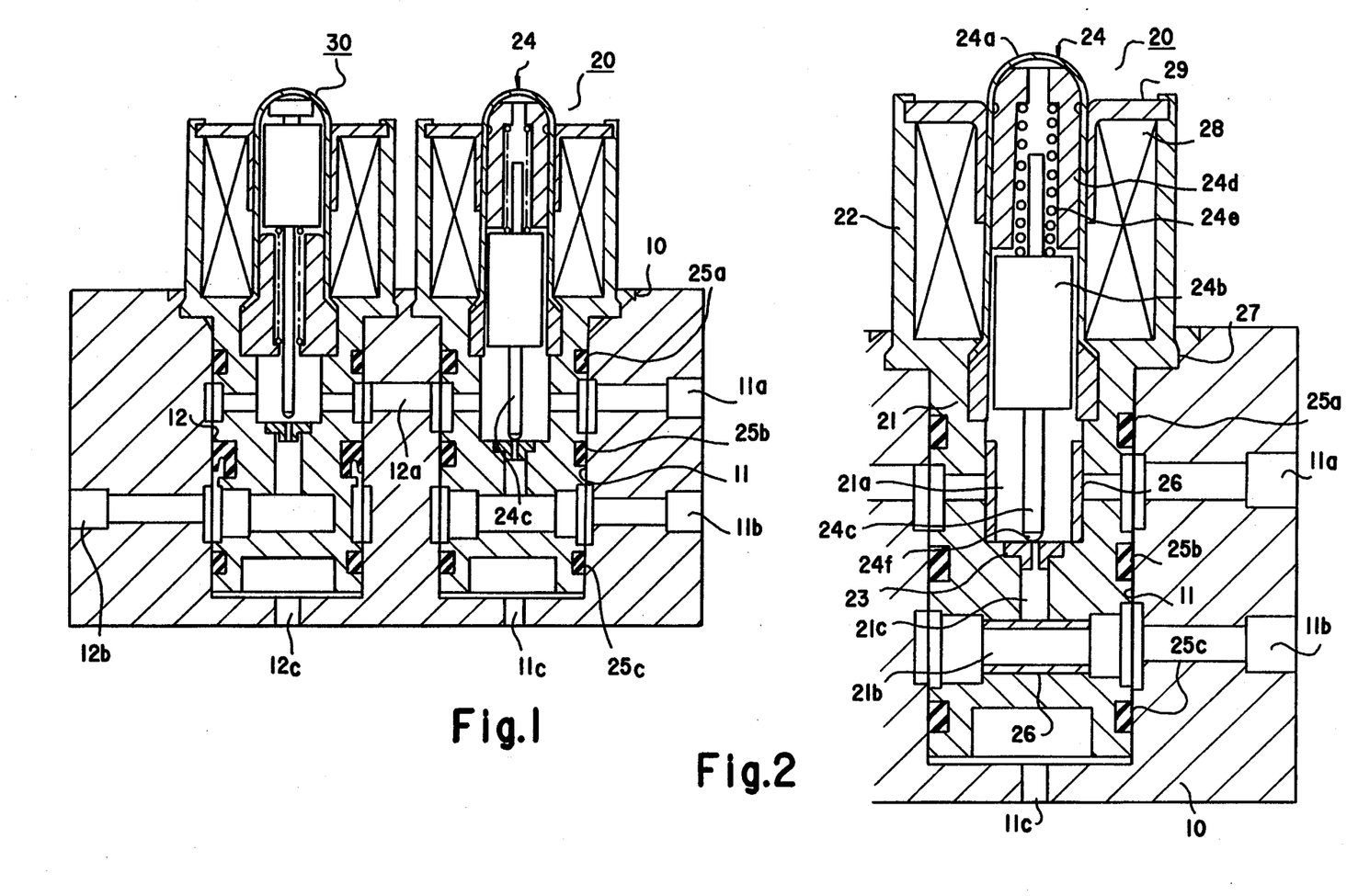
FIG. 1 is a complete diagram of the solenoid valve according to the present invention as embodied in Example 1.
FIG. 2 is a cross sectional diagram of a normal closed solenoid valve.

FIG. 1 illustrates an example of this invention in which one normally closed solenoid valve 20 and one normally open solenoid valve 30 are mounted in the mounting block 10.

This basic configuration of valve 20 and valve 30 are the same with the only differences being the normal position of the plunger. Thus, only the normally closed solenoid valve 20 as shown on the right side of the diagram will be explained, and an explanation of the normally open solenoid valve 30 will be omitted.

B. Mounting Block

Housing cavities 11, 12 are bored in the mounting block 10 for the insertion of solenoid valve 20, 30 respectively. In addition, inlet ports 11a, 12a and outlet ports 11b, 12b for connection and passage of the pressure fluid lines are drilled on the side of housing cavities 11, 12 respectively.

In order to prevent the generation of an axial force as described previously, the inner diameter of housing cavities 11, 12 must be virtually identical, and ports 11a, 11b, 12a, 12b must be connected for passage on the side face of housing cavities 11, 12.

Air inlet holes 11c, 12c are drilled on the bottom of housing cavities 11, 12 respectively.

C. Solenoid Valve

FIG. 2 is an enlarged diagram of solenoid valve 20. The cylindrical housing 21 is manufactured to yoke 22 to form a single piece, and flange 27 is manufactured onto the foot of the housing 21.

The external diameter of housing 21 is manufactured to be virtually equal to the inner diameter of housing cavity 11. Pressure chamber 21a connected with passage to inlet port 11a and pressure chamber 21b connected with passage to outlet port 11b are each molded inside housing 21. Moreover, there is passage between the two pressure chambers 21a, 21b via a passage line 21c.

Valve seat 23 is positioned on the end of passage line 21c on the pressure chamber 21a side. Seals 25a–25c comprised of O-rings and other sealing components are mounted at several places around the circumference of housing 21 to ensure an airtight seal around pressure chambers 21a, 21b.

Core assembly 24 is affixed with caulking in front of pressure chamber 21a in the axis center of housing 21. As well, housing 21 is affixed with caulking to the mounting block 10.

Other publicly disclosed means of affixing the housing 21 can be employed. For example, pins or springs can be inserted and affixed across both the mounting block 10 and housing 21. In addition, a portion of the inner circumference of housing cavity 11 and a portion of the outer circumference of housing 21 can be joined with screws.

Core assembly 24 is comprised of armature 24b, plunger 24c, magnet core 24d, and spring 24e housed inside sleeve 24a.

A valve arrangement which either blocks or enables passage between pressure chamber 21a and 21b is comprised of the valve head 24f set on the tip of plunger 24c and valve seat 23. Spring 24e is energized in a direction such that the said valve arrangement will block passage between the chambers.

Energizing coil 28, manufactured by winding a coil around a hollow bobbin, is fitted around the exterior circumference of sleeve 24a, and is affixed firmly with caulking to yoke 22 by means of yoke ring 29.

A filter 26 is housed within each pressure chamber 21a, 21b.

Operation of Example 1

The generation of an axial force as pressure is generated in each pressure chamber 21a, 21b when the valve arrangement is closed during operation of solenoid valve 20 described above is explained.

Pressure is generated with fluid supply from inlet port

Figure 3:
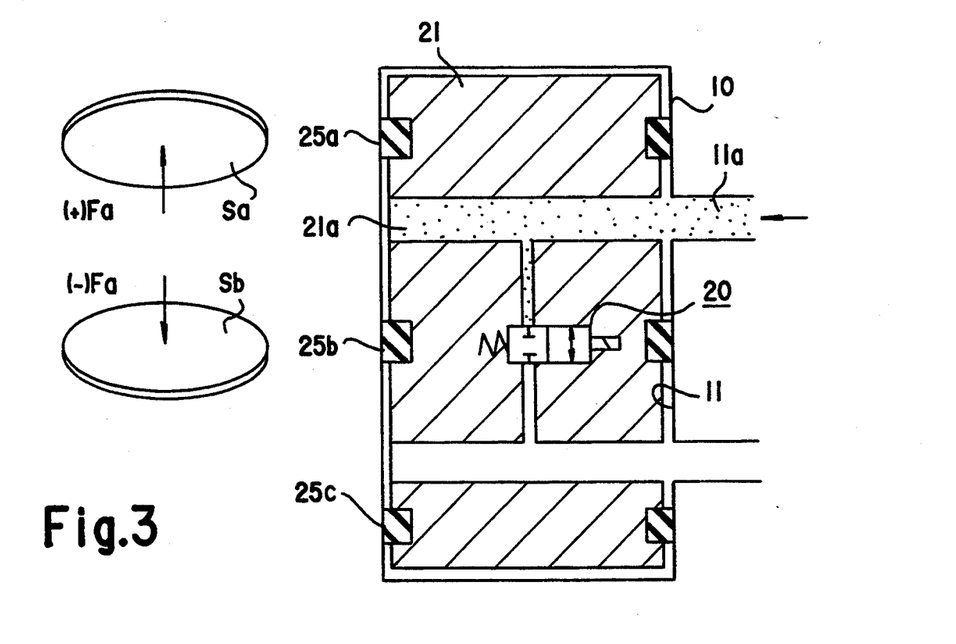
FIG. 3 is a conceptual diagram to explain the operation of a solenoid valve.

As shown in FIG. 3, each pressure chamber 21a and 21b is sealed on either side of seals 25a–25c respectively, wherein the pressure-subjected areas Sa–Sc of each seal 25a–25c are set to be virtually equal.

Given this configuration, when the internal pressure of pressure chamber 21a connected with passage to inlet port 11a starts to rise, an axial force Fa is generated in opposite directions on either side of the pressure chamber 21a (up and down direction in the diagram).

Since the pressure-subjected areas Sa and Sb of seals 25a and 25b are virtually equal, then the axial forces Fa, Fa generated on either side of pressure chamber 21a are virtually identical. Moreover, since the forces are acting in the opposite direction, the two forces counteract to cancel each other. As a result, an axial force is never generated in one direction only no matter how high the internal pressure within pressure chamber 21a. Thus, housing 21 will not become separated from the housing cavity 11 even in the absence of a pressure plate pressing against the upper end of housing 21.

B. Pressure is generated with fluid supply from outlet port

Figure 4:
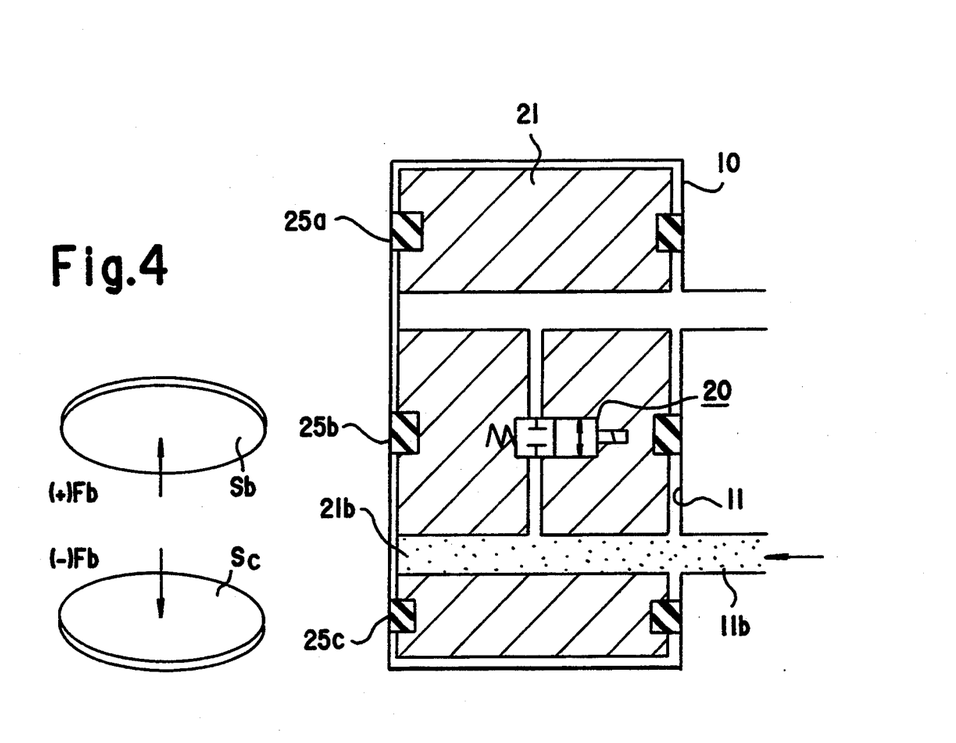
FIG. 4 is another conceptual diagram to explain the operation of a solenoid valve.

As shown in FIG. 4, when the internal pressure of pressure chamber 21b connected with passage to outlet prot 11b starts to rise, an axial force Fb is generated in opposite directions on either side of the pressure chamber 21b (up and down direction in the diagram).

Since the pressure-subjected areas Sb, Sc of seals 25b and 25c are virtually equal, then the axial forces Fb, Fb generated on either side of pressure chamber 21b are virtually equal. Moreover, since the forces are acting in the opposite direction, the two forces counteract to cancel each other. As a result, an axial force is never generated in one direction only no matter how high the internal pressure within pressure chamber 21b. thus, housing 21 will not become separated from the housing cavity 11 even in the absence of a pressure plate pressing against the upper end of housing 21.

C. Pressure difference is generated

Similarly, should a pressure difference be generated between the fluid chambers 21a and 21b, the axial forces acting on each pressure chamber counteract and thereby cancel each other.

Thus, unlike conventional solenoid valves, no axial force is generated from the high-pressure side to the low-pressure side, nor is any generated in the reverse direction.

Example 2

Figure 5:
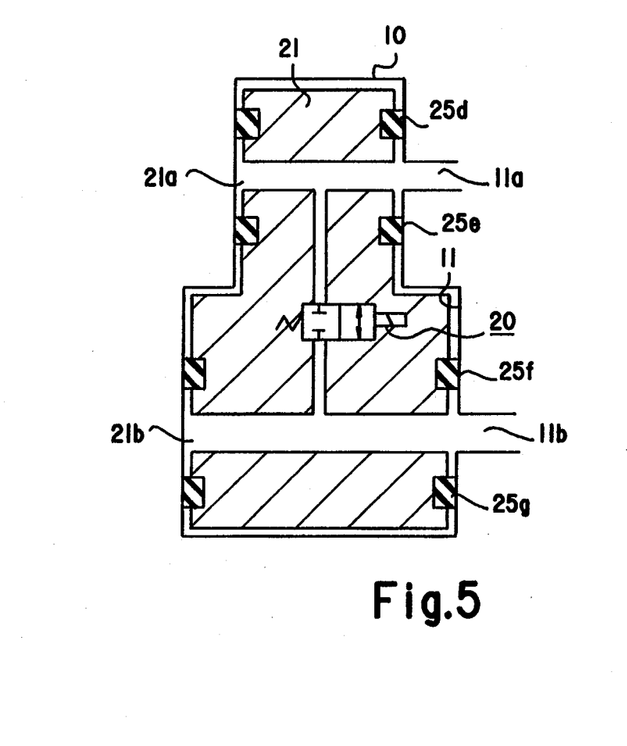
FIG. 5 is an explanatory diagram of the solenoid valve as embodied in Example 2.

The principle of the solenoid valve of this invention is that the axial forces acting in opposite directions will be equally balanced for each pressure chamber. Thus, as shown in FIG. 5, the housing cavity 11 can be manufactured to have a non-uniform diameter for each pressure chamber.

That is in this configuration, seals 25d, 25e are mounted on either side in the axial direction of pressure chamber 21a which has passage to port 11a. Seals 25f-25g are mounted on either side in the axial direction of pressure chamber 21b which has passage to port 11b. The pressure-subjected areas on either side of the pressure chambers 21a, 21b are set to be virtually equal.

Example 3

Figure 6:
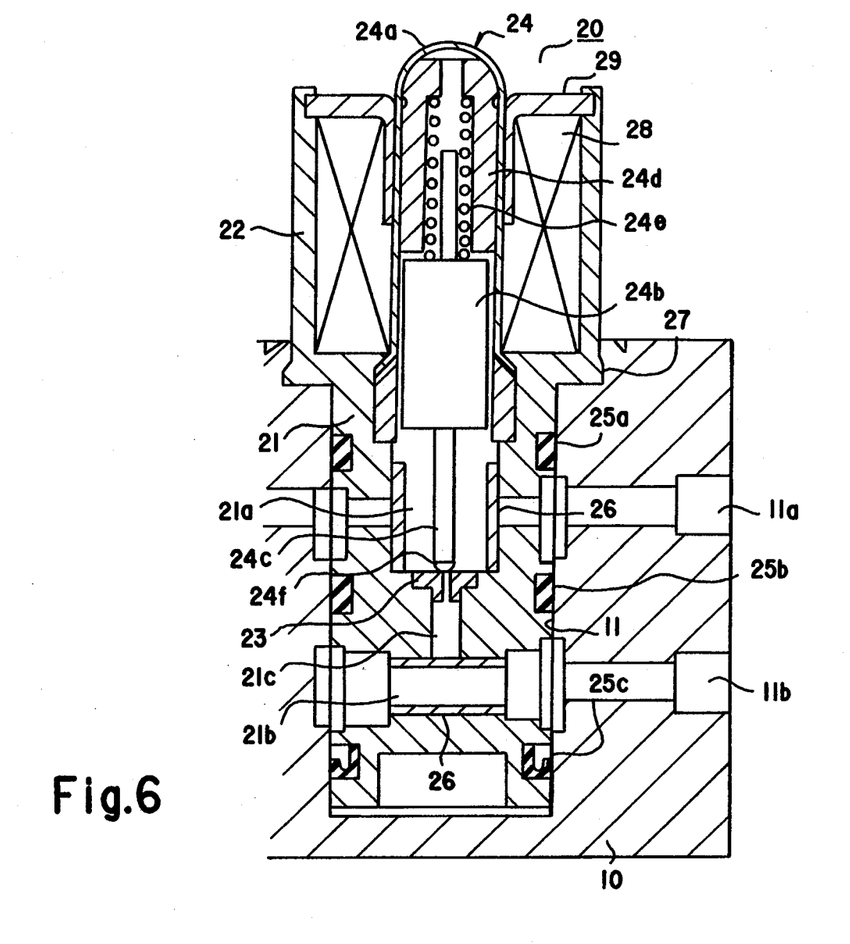
FIG. 6 is an explanatory diagram of the solenoid valve as embodied in Example 3.

As shown in FIG. 6, of the seals 25a-25c mounted on the exterior circumference of housing 21, the O-ring of seal 25c which is closest to the bottom of the housing cavity 11 can be replaced by a cup seal.

This cup seal enables air trapped in the bottom of the hole of housing cavity 11 upon insertion and assembly of the housing 21 to be vented outside of the housing cavity, thus eliminating the necessity of drilling an air channel 11c as shown in FIG. 2.

Example 4

Examples 1-3 explain the configuration and operation of a 2-position-2-way solenoid valve, but the same principles can apply to a 2-position-3-way solenoid valve or 3-position-3-way solenoid valve as well.

The pressure medium can be pneumatic, as well as hydraulic.

Example 5

Other configurations of this invention are explained with reference to FIG. 7 and FIG. 8.

A. Overall configuration

Figure 7:
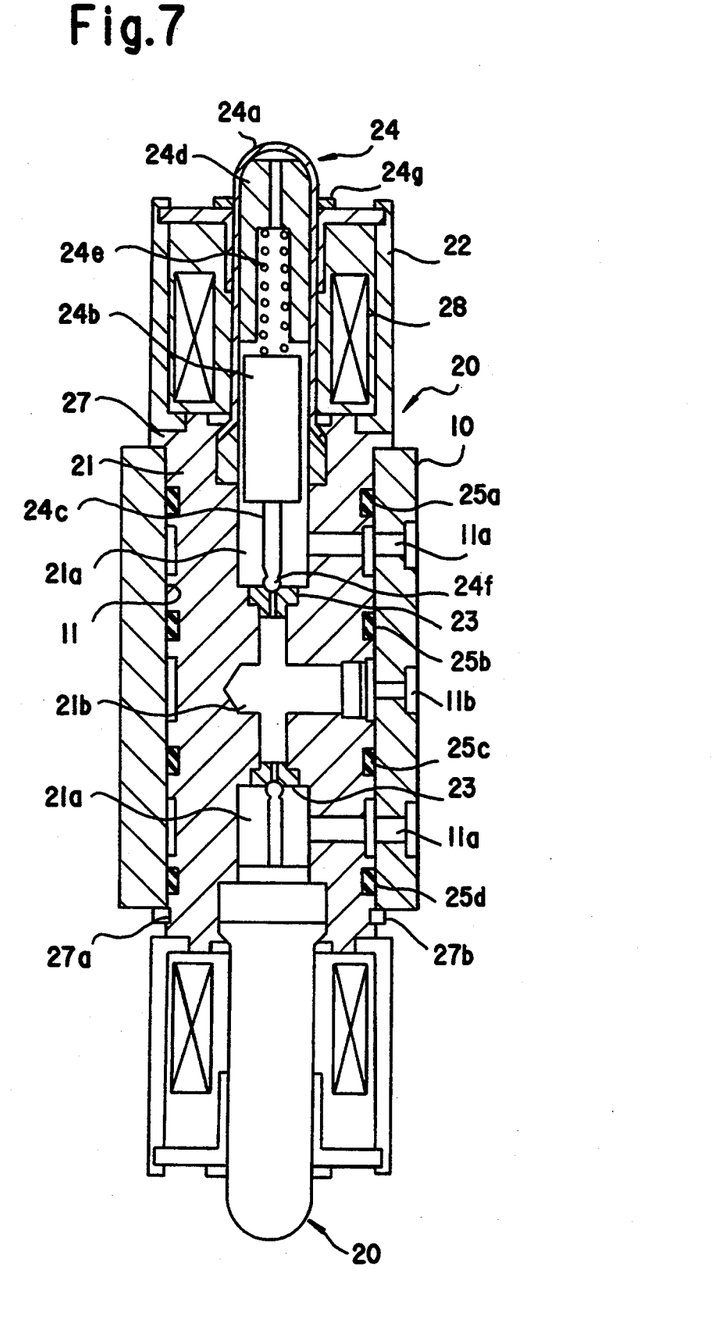
FIG. 7 is a partial cross sectional diagram of a solenoid valve as embodied in Example 5.

FIG. 7 shows a configuration in which two normally closed solenoid valves 20, 20 are inserted facing each other into the mounting block 10.

B. Mounting block

One housing cavity 11 is bored through the thickness of the mounting block 10 for a pair of solenoid valves 20, 20 and two inlet ports 11a, 11a and outlet port 11b for connection and passage of the pressure fluid lines are drilled into the side of the housing cavity 11.

In this configuration, it is important that the inner diameter of the housing cavity 11 be uniform over its entire length, and each port 11a, 11a, 11b must be connected for passage on the side face of the housing cavity 11.

C. Solenoid valve

As shown in FIG. 7, housing 21 is manufactured to be of the same diameter as the housing cavity 11.

Whereas in the previous examples, a different housing was required for each solenoid valve. In this configuration, a single housing 21 is used jointly by both valves.

Flange 27 of diameter greater than the housing cavity 11 protrudes from the outer circumference of one end of housing 21, and a ring-shaped groove 27a is inlaid around the outer circumference at the other end.

Housing 21 is inserted with the ring groove end with the lower end of the housing cavity 11, wherein a ring-shaped check clamp 27b is slipped into the groove 27a which becomes exposed outside of the housing cavity 11.

Other publicly disclosed means of affixing the housing 21 can be employed. For example, pins or springs can be inserted and affixed across both the mounting block 10 and housing 21; or caulking can be applied such that the end faces of housing 21 will cover the edges of mounting block 10.

Two pressure chambers 21a, 21a are each connected with passage to a corresponding inlet port 11a, 11a and to outlet port 11b. These chambers along with pressure chamber 21b which is connected with passage between the two pressure chambers 21a, 21a are manufactured along the axis center of housing 21.

A filter, not shown in the diagram, is housed in each pressure chamber 21a, 21a, 21b. Valve seat 23 is set at the bottom of each pressure chamber 21a, 21a. Ring-shaped seals 25a-25d are mounted in several places around the outer circumference of housing 21 to ensure a tight seal between the housing and the housing cavity 11.

A core assembly 24 is affixed with caulking to each pressure chamber 21a, 21a, wherein each said core assembly comprises an armature 24b, a plunger 24c, a magnet core 24d, and spring 24e housed inside sleeve 24a.

A valve arrangement which either blocks or enables passage between pressure chamber 21a, 21a and 21b is comprised of the valve head 24f set on the tip of plunger 24c, and the valve seat 23. Spring 24e is energized in the direction that the valve arrangement will block passage between pressure chambers.

Core assembly 24 is affixed with caulking or other bonding means at the bottom of sleeve 24a which is inserted into housing 21.

Energizing coil 28, is manufactured by winding a coil around a hollow bobbin which can be fitted around the exterior circumference of sleeve 24a, wherein yoke 22 is manufactured around the said coil with a resin to form a single piece. That portion of sleeve 24a which protrudes beyond the end of energizing coil 28 is affixed with a retaining ring 24g so that it will not become separated.

Operation of Example 5

The operation of solenoid valve in this configuration is explained next.

A. Switching the lines

As shown in FIG. 7, if energizing coil 28 is de-energized, spring 24e is energized in the direction that armature 24b becomes separated from magnet core 24d. The valve head 24f remains seated in valve seat 23 to block the line between pressure chamber 21a and the common pressure chamber 21b.

As a result, the pressure medium transmitted to inlet port 11a from the supply source is blocked inside pressure chamber 21a, and is not transmitted to the common pressure chamber 21b.

If energizing coil 28 is energized, a magnetic field is generated, wherein armature 24b resists the spring force of spring 24e and moves in the direction to contact magnet core 24d. As a result, valve head 24f becomes unseated from valve seat 23 and passage is opened in the line between pressure chamber 21a and common pressure chamber 21b.

Consequently, the pressure medium transmitted from the supply source to inlet port 11a reaches pressure chamber 21a, then is further transmitted through the common pressure chamber 21b to the outlet port 11b.

B. Pressure considerations

Figure 8:
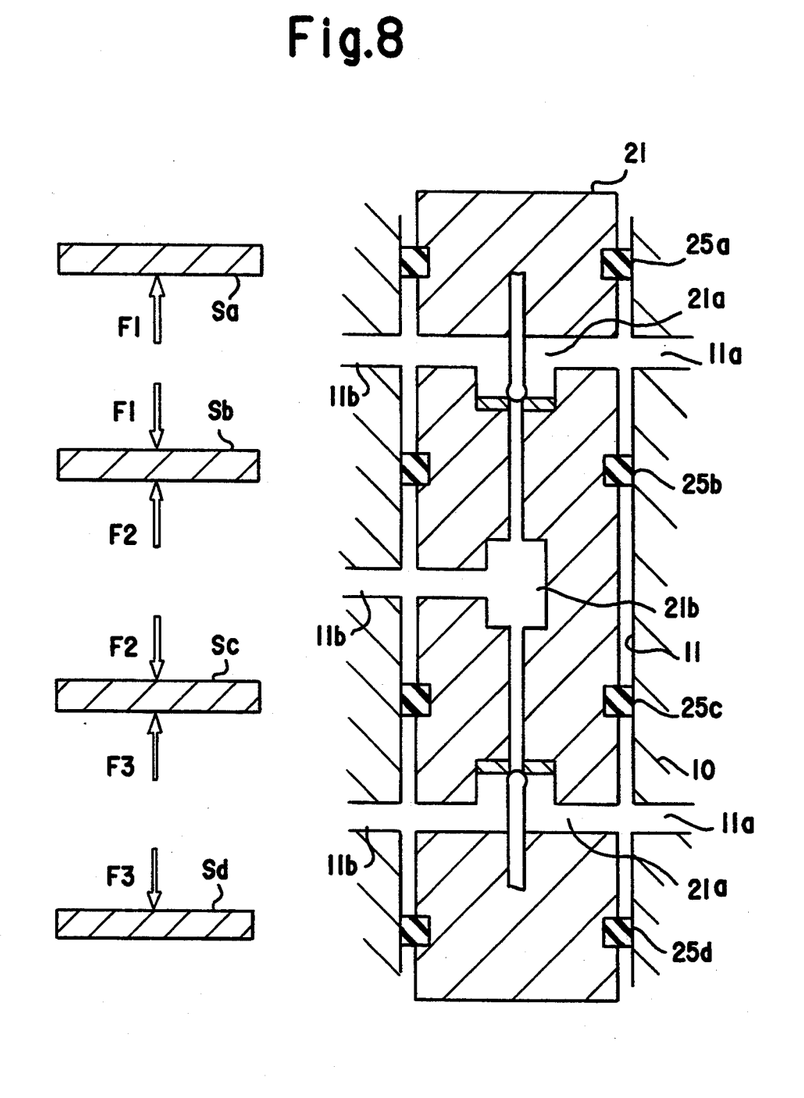
FIG. 8 is a detailed diagram to explain the operation of a solenoid valve.

As shown in FIG. 8, either side of each chamber 21a, 21a, and 21b is sealed by one of seals 25a–25d, designed such that the pressure-subjected areas Sa–Sd of all seals are virtually equal.

Given this configuration, should for example the internal pressure of the upper pressure chamber 21a rise, the pressure acts upon seals 25a, 25b positioned on either side of pressure chamber 21a.

Since the pressure-subjected areas Sa, Sb of seals 25a and 25b are virtually equal, then the axial forces F1, F1 generated on either side of pressure chamber 21a are also equal. Moreover, since the forces are acting in opposite directions, the two forces counteract and thereby cancel each other.

Similarly, should the internal pressure in common pressure chamber 21b rise, then since the pressure-subjected areas Sb, Sc of seals 25b, 25c respectively are equal, no axial force F2 is generated.

Additionally, no axial force is generated if the internal pressure in pressure chamber 21a should fall.

Moreover, should the same pressure or a pressure difference arise simultaneously in pressure chambers 21a, 21a, and 21b, the forces in the axial direction acting on each chamber will be balanced, and no axial force is generated.

Example 6

Figure 9:
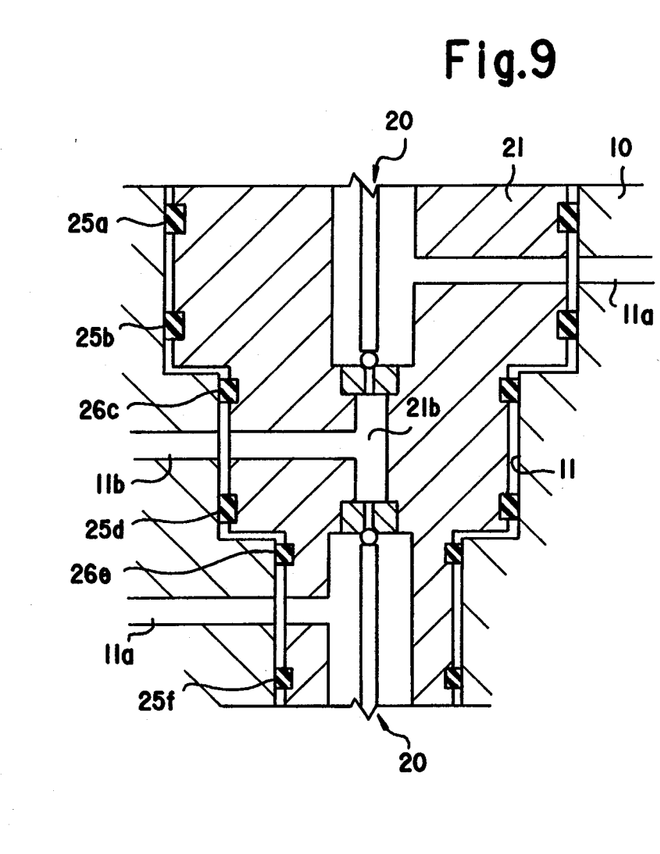
FIG. 9 is a detailed diagram to explain a solenoid valve as embodied in Example 6.

FIG. 9 illustrates another example where the housing cavity 11 is manufactured to have a non-uniform diameter along its thickness.

In explaining this example, those components which are common to the previous examples have the same identifying number for which a detailed explanation will be omitted here.

In the configuration of this example, a pair of seals 25a–25f are mounted in the axial direction on either side of pressure chambers 21a, 21a, 21b respectively; wherein the pressure-subjected areas on either side of each chamber in the axial direction are set to be virtually equal.

Example 7

Example 5 and Example 6 explain the configuration and operation of a 2-position-2-way solenoid valve. However, the principle of this invention is that the pressure is equalized for each pressure chamber, and can apply to a 2-position-3-way solenoid valve or 3-position-3-way solenoid valve as well.

The pressure medium can be pneumatic as well as hydraulic.

Example 8

Figure 10:
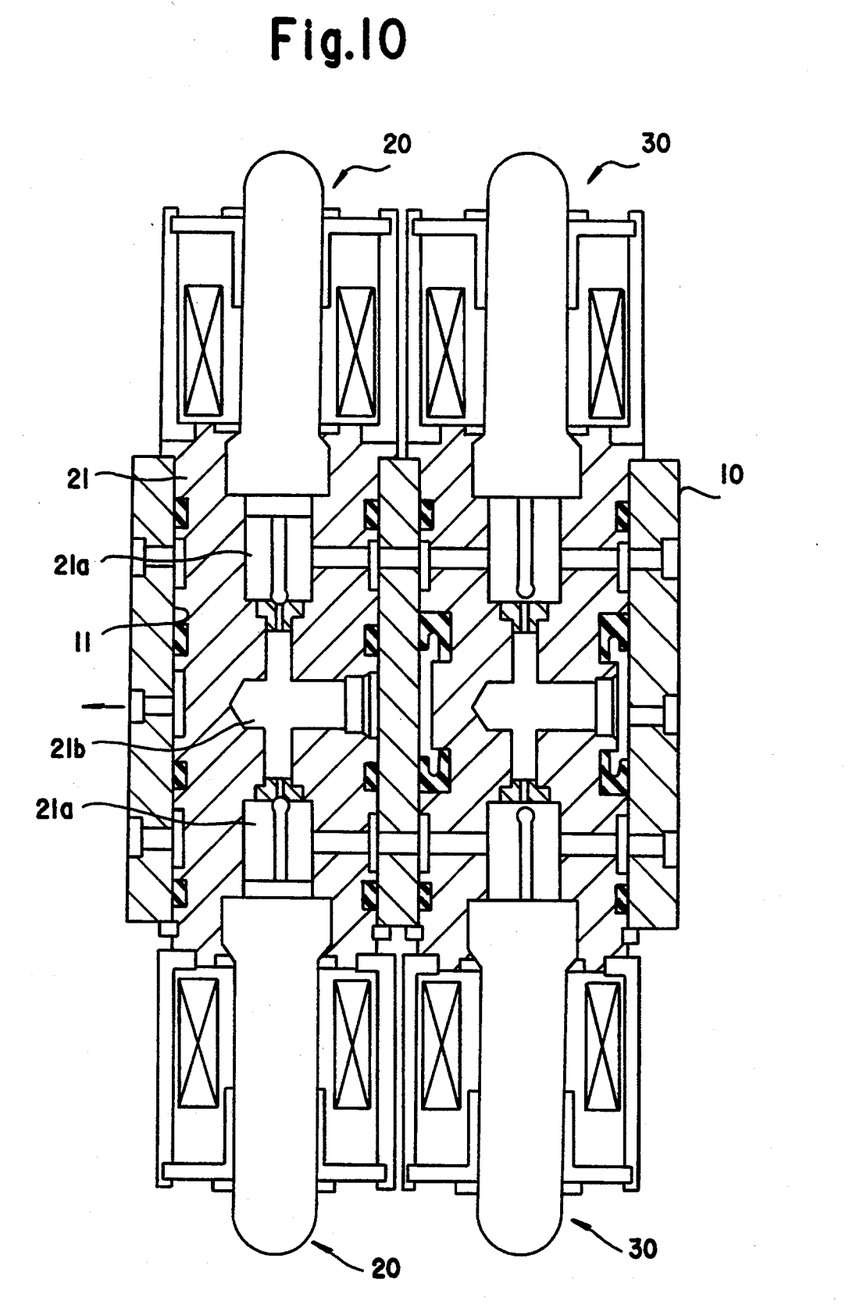
FIG. 10 is a cross sectional diagram of a solenoid valve as embodied in Example 8.

As shown in FIG. 10, in another configuration of this invention, two solenoid valves 20 are set face-to-face to form one unit, and two units are connected in parallel.

The number of solenoid valves 20 in any one configuration is not restricted to the amount shown in the diagram.

Example 9

FIG. 10 shows an example this configuration in which two normally closed solenoid valves 20, 20 or two normally open solenoid valves 30, 30 are set face-to-face. However, a normally closed valve can be coupled face-to-face with a normally open valve.

The components and principle of the solenoid valve 30 is identical to the solenoid valve 20 except for the energizing direction of the armature, and thus an explanation of the valve is omitted.

Example 10

This invention can also be applied to valves other than solenoid valves 20, 30 such as those publicly-disclosed solenoid valves in which a force is generated in the axial direction with an increase in the pressure medium.

Although specific embodiments of the instant invention have been described above and illustrated in the accompanying drawings in order to be more clearly understood, the above description is made by way of example and not a limitation to the scope of the instant invention. It is contemplated that various modifications apparent to one of ordinary skill in the art could be made without departing from the scope of the invention which is to be determined by the following claims.

What is claimed is:

1. A solenoid valve for switching a hydraulic fluid line, comprising:

a mounting block having a housing cavity;

a monolithic housing operatively mounted in said mounting block;

a first fluid chamber defined in said housing and operatively connected to a first inlet port defined in said mounting block;

a second fluid chamber defined in said housing and operatively connected to a second inlet port defined in said mounting block;

a third fluid chamber defined in said housing between said first and second fluid chambers and operatively connected to an outlet port defined in said mounting block;

a fluid line defined in said housing interconnecting said first, second and third fluid chambers;

an electromagnetically-actuable valve means operatively positioned between said first, second and third fluid chambers, for selectively controlling opening and closing of fluid flow between said first and third fluid chambers and between said second and third fluid chambers;

wherein said electromagnetically-actuable valve means includes first and second solenoid valves operatively located with said first and second fluid chambers, respectively, and positioned face-to-face along the axial direction of said housing; and seal means for sealing said housing in the housing cavity so as to equalize and thereby cancel out opposing axial forces occurring during operation, said seal means including a plurality of seals located on an outer peripheral surface of said housing, each of the plurality of seals being operatively located relative to an axial direction thereof on either side of said fluid line, the inlet port and the outlet port, and the plurality of seals being formed such that pressure-subjected areas of the seals are substantially equal to each other.

2. A solenoid valve for switching a hydraulic fluid line, comprising:

a mounting block having a housing cavity;

a monolithic housing operatively mounted in said mounting block;

a first fluid chamber defined in said housing;

a second fluid chamber defined in said housing;

a third fluid chamber defined in said housing between said first and second fluid chambers;

a fluid line defined in said housing interconnecting said first, second and third fluid chambers;

an electromagnetically-actuable valve means operatively positioned between said first, second and third fluid chambers, for selectively controlling opening and closing of fluid flow between said first and third fluid chambers and between said second and third fluid chambers;

wherein said electromagnetically-actuable valve means includes first and second solenoid valves operatively located with said first and second fluid chambers, respectively, and positioned face-to-face along the axial direction of said housing; and seal means for sealing said housing in the housing cavity so as to equalize and thereby cancel out opposing axial forces occurring during operation, said seal means including a plurality of seals located on an outer peripheral surface of said housing, each of the plurality of seals being operatively located relative to an axial direction thereof on either side of said fluid line and the plurality of seals being formed such that pressure-subjected areas of the seals are substantially equal to each other.

* * * * *